US011542909B1

(12) United States Patent
Andersson

(10) Patent No.: US 11,542,909 B1
(45) Date of Patent: Jan. 3, 2023

(54) AUTOMATIC CONTROL VALVE WITH MICRO-HYDRO GENERATOR

(71) Applicant: Flomatic Corporation, Glens Falls, NY (US)

(72) Inventor: Allan Bo Andersson, Cambridge, NY (US)

(73) Assignee: FLOMATIC CORPORATION, Glens Falls, NY (US)

( * ) Notice: Subject to any disclaimer, the term of this patent is extended or adjusted under 35 U.S.C. 154(b) by 0 days.

(21) Appl. No.: 17/649,447

(22) Filed: Jan. 31, 2022

(51) Int. Cl.
| F03B 13/10 | (2006.01) |
| F16K 15/06 | (2006.01) |
| F16K 27/02 | (2006.01) |
| H02K 7/00 | (2006.01) |
| H02K 7/18 | (2006.01) |

(52) U.S. Cl.
CPC ............ *F03B 13/10* (2013.01); *F16K 15/063* (2013.01); *F16K 27/0209* (2013.01); *H02K 7/003* (2013.01); *H02K 7/1823* (2013.01)

(58) Field of Classification Search
CPC .... F03B 13/10; F16K 15/063; F16K 27/0209; H02K 7/003; H02K 7/1823
See application file for complete search history.

(56) References Cited

U.S. PATENT DOCUMENTS

| 1,946,182 A | 2/1934 | Thompson |
| 3,546,965 A | 12/1970 | Alvarez et al. |
| 4,246,753 A | 1/1981 | Redmond |
| 4,352,025 A | 9/1982 | Troyen |
| 4,496,845 A | 1/1985 | Ensign et al. |
| 4,731,545 A | 3/1988 | Lerner et al. |
| 6,824,347 B2 | 11/2004 | Maloney |
| 7,608,936 B2 | 10/2009 | Shimizu et al. |
| 7,675,188 B2 | 3/2010 | Baarman et al. |
| 2005/0275224 A1 | 12/2005 | Potter et al. |
| 2009/0236852 A1 | 9/2009 | Balzano |
| 2012/0261921 A1 | 10/2012 | Kaiser |
| 2014/0265328 A1 | 9/2014 | Van Blerk |
| 2022/0018326 A1* | 1/2022 | Cheron ................... F03B 13/00 |

FOREIGN PATENT DOCUMENTS

| CN | 2363270 Y | 2/2000 |
| CN | 2866889 Y | 2/2007 |
| ES | 2538751 A1 | 4/2016 |
| JP | 5230175 B2 | 7/2013 |
| KR | 101307656 B1 | 9/2013 |
| TW | 456463 U | 7/2013 |
| WO | 2009130030 A1 | 10/2009 |

* cited by examiner

*Primary Examiner* — Joseph Ortega
(74) *Attorney, Agent, or Firm* — Heslin Rothenberg Farley & Mesiti, P.C.

(57) ABSTRACT

An automatic control valve is provided for generating power based on fluid flow. In one example, the automatic control valve includes a primary passage including a valve seat disposed between an inlet and an outlet and a valve seat. A valve member is moveable between an open position and a closed position depending on the fluid flow. The automatic control valve includes a rotatable valve stem that is affixed at one end to an impeller and operably affixed to a drive shaft of a generator at the other end. As fluid flows to move the valve member to an open position, the impeller with the rotatable shaft and the drive shaft of the generator rotate to produce electric power.

24 Claims, 5 Drawing Sheets

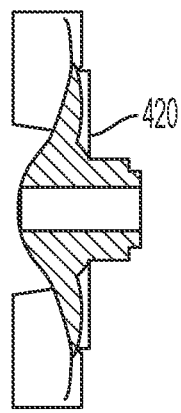
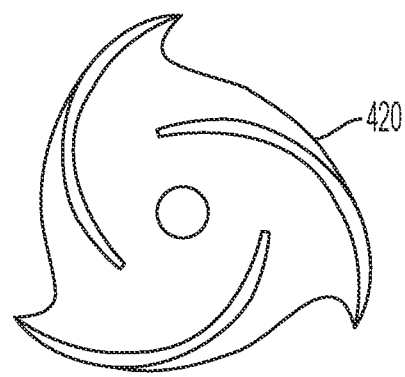
FIG. 4A     FIG. 4B
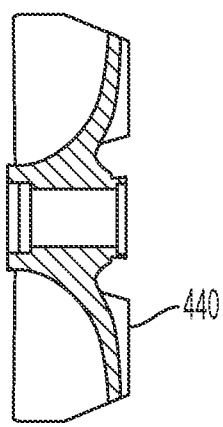
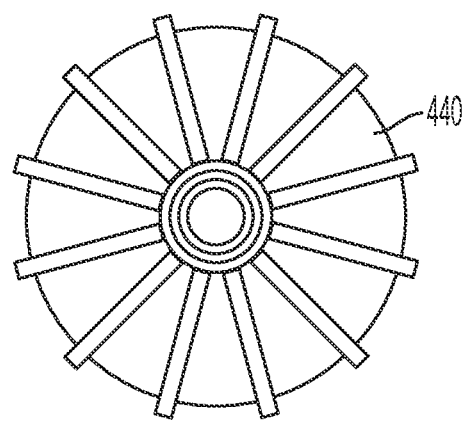
FIG. 5A     FIG. 5B

AUTOMATIC CONTROL VALVE WITH MICRO-HYDRO GENERATOR

TECHNICAL FIELD

This invention relates generally to the field of valves, and more specifically, to a pressure reducing valve designed to generate electric power while controlling down-stream pressure regardless of flow condition.

BACKGROUND OF THE INVENTION

The water industry is facing significant challenges relating to increases in the costs of maintaining infrastructure and declining water demand resulting in declining revenue. Many water utilities are struggling to meet the increasing operating costs while, at the same time, improving drinking water and wastewater infrastructure. The 2018 U.S. Environmental Protection Agency's (EPA) Drinking Water Infrastructure Needs Survey and Assessment estimates that $472.6 billion will be needed to upgrade drinking water infrastructure over the next twenty years. One solution to cover this cost is to increase rates. However, this solution can be unpopular, especially if any rate changes are large and unexpected.

Another solution may be lowering operating costs with a more efficient water treatment and transport system. Energy demands and associated costs rank among the most important issues facing water companies. Energy consumption is one of the largest operation and maintenance costs for water utilities, second only to the cost of labor. Achieving energy efficiency can be a primary focus for reducing costs.

The use of hydroelectric power by water utilities is increasingly desirable to compensate for increased infrastructure costs and financial shortfalls resulting from decreased demand. Although several options have been proposed for using hydroelectric power, additional advancements are needed to provide a sustainable energy solution for the water utilities industry.

SUMMARY OF THE INVENTION

The shortcomings of the prior art may be alleviated by using an automatic control valve with an integrated micro-hydro electric generator constructed in accordance with one or more aspects of the present invention. The automatic control valve with an integrated micro-hydro electric generator constructed in accordance with one or more aspects of the present invention may be used for municipal, industrial, commercial, irrigation and agricultural pump systems. The automatic control valve with an integrated micro-hydro electric generator is designed to generate electric hydropower while controlling down-stream pressure regardless of flow conditions. Additionally, other uses may be made of the invention that fall within the scope of the claimed invention but which are not specifically described below.

In one aspect of the invention, there is provided a valve designed to take advantage of the pressure differential between an inlet and an outlet of a valve by generating electric power. In this compact configuration, no additional piping or physical space is needed beyond the automatic control valve. In one embodiment, the valve includes a housing. The housing includes an inner periphery surface defining a passage therethrough between an inlet port and an outlet port. The valve also includes a flange within the housing. The flange divides the passage into an inlet chamber proximate the inlet port and an outlet chamber proximate the outlet port. The flange extends circumferentially around the inner periphery surface of the housing. The flange defining a valve seat and including an inner surface defining a valve aperture. The valve also including a valve member moveably disposed within the housing from an open position and a closed position. The valve member controlling fluid flow between the inlet chamber and the outlet chamber through the valve aperture. The valve member resiliently biased in a closed position against the valve seat. The valve further including a rotatable shaft. The rotatable shaft including a first end and a second end. The rotatable shaft extending through the valve member and rotatable relative to the valve member. The valve further including an impeller and a generator. The impeller is affixed to the rotatable shaft at the first end. The impeller rotatable when valve member is in the open position. The second end of said the rotatable shaft is operably affixed to the generator in the open position.

In another aspect, Additional features and benefits will become apparent from the following drawings and descriptions of the invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the end of the specification. The foregoing and other objects, features, and advantages of the invention are apparent from the following detailed description taken in conjunction with the accompanying drawings in which:

FIG. 4A depicts a side cross-sectional view of one example of an impeller that may be used with an automatic control valve constructed in accordance with one or more aspects of the present invention;

FIG. 4B depicts a bottom view of the impeller illustrated in FIG. 4A

FIG. 5A depicts a side cross-sectional view of one example of an impeller that may be used with an automatic control valve constructed in accordance with one or more aspects of the present invention;

FIG. 5B depicts a bottom view of the impeller illustrated in FIG. 5A;

DETAILED DESCRIPTION OF EMBODIMENTS OF THE INVENTION

Figure 1:
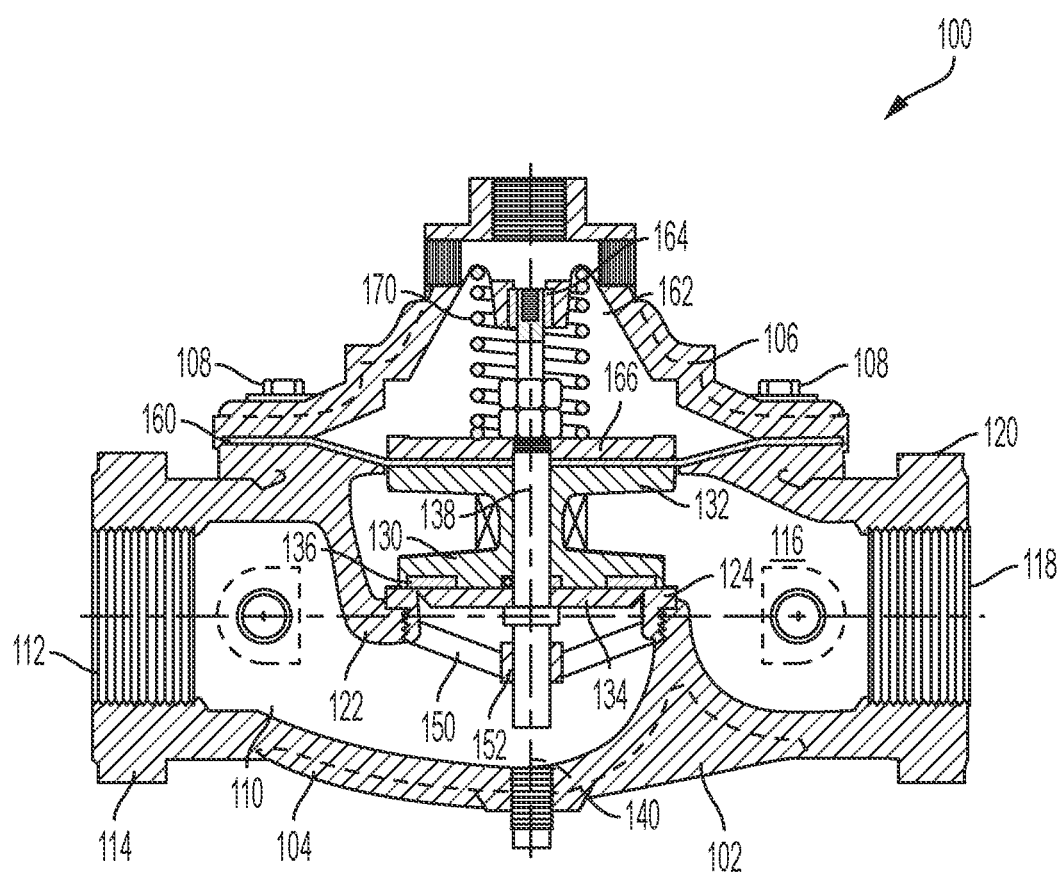
FIG. 1 depicts a cross-sectional view of a conventional automatic control.

For the purposes of promoting an understanding of the principles of a automatic control valve with an integrated micro-hydro electric generator designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the control valve invention relates.

Prior attempts to generate hydroelectric energy in a distribution line or between a dam and water treatment plant focus on replacing a pressure reducing valve with a micro-hydroelectric turbine in the line. The use of water to generate hydroelectric energy may be a sustainable solution for small and large water utilities to become energy-neutral or net-energy. The December 2018 issue of the American Water Works Associations ("AWWA") Journal entitled "Hydroelectric Energy as a Water System Solution", which is hereby incorporated herein by reference, identifies two scenarios showing where, for example, a micro-hydroelectric turbine could replace a pressure-reducing valve where hydroelectric potential energy is being wasted. For example, a micro-hydroelectric turbine could replace a pressure reducing valve located in a distribution line between a water treatment plant/water tower and a house or between a dam and a water treatment plant. The generation of hydropower reduces the pressure in a pipeline such that a micro-hydroelectric turbine often replaces a pressure reducing valve.

An automatic control valve with an integrated micro-hydro electric generator constructed in accordance with one or more aspects of the present invention combines these units in one to provide an automatically functioning unit that is sensitive to the flow demands and maintains downstream pressure while maintaining a backpressure to prevent drafting of the system.

An automatic control valve with an integrated micro-hydro electric generator constructed in accordance with one or more aspects of the present invention is designed to take advantage of the pressure differential between the inlet and the outlet of the valve to generate electric power in distribution lines between a water treatment plant/water tower and a house or between a dam and a water treatment plant. Such an automatic control valve may also be used in deep water system wells where distribution systems are much lower than the wellhead. These applications are found in, for example, Hawaii where the water wells are five hundred to one thousand feet deep and located in the center of the high portion of the islands and while the water use is around the coastline at a much lower level.

In addition, a good example is the City of Asheville relying on twenty-two thousand acres of forested mountain region surrounding its watershed, which makes it one of the largest municipally owned watersheds in the United States. The Water Resources Department operates three water treatment plants supplying the hillside city and communities from high-pressure supply lines with many pressure-regulating valves conditioning the water supply pressure. An automatic control valve with an integrated micro-hydro electric generator constructed in accordance with one or more aspects of the present invention can help the City of Asheville recoup some of the water plant electric energy. As the City of Asheville is in the mountains, its water distribution system water pressure is much higher than what is found in flatter areas. The average water pressure is 150 psi, and in some locations, can be over 200 psi (see e.g. https://drive.google.com/file/d/111yKnq--OboowzHaWIpWk2NcEtTocjeM/view).

In the above example, the automatic control valve with an integrated micro-hydro electric generator constructed in accordance with one or more aspects of the present invention makes it possible to recoup much of the electric power used by the high-pressure water pump. The integration of a hydroelectric generating unit with a pressure-reducing valve provides water utilities an opportunity to manage system pressure and the generation of recurring income from converting excess pressure into clean, low-cost electric power. Instead of dissipating excess pressure in a traditional pressure-reducing valve, the integrated micro-hydro electric generator converts the hydraulic energy into electricity to help offset energy costs. Depending on the site conditions and system hydraulics of the piping distribution systems, there are a wide range of potential investment payback scenarios for water utilities to consider whether these systems are appropriate. Thus, calculating justifications and the payback of a pressure-reducing valve with an integrated hydroelectric generating system for a water utility using power to supply energy for its own pumps can be beneficial.

In one embodiment, a conventional automatic control valve may be modified to incorporate a micro-hydro electric generator. In this example, the automatic control valve may be modified with a rotatable drive shaft. The lower end of the rotatable draft shaft passes through the valve's center spool assembly and seat of the valve in-let and is equipped with a pump impeller. The pump impeller, connected to the valve stem, is free to rotate regardless of if the valve is fully open or near closing (e.g. not in closed position). The other end of the valve stem is connected to the drive shaft of an electric generator that converts the rotation caused by the pump impeller into electrical power. In one embodiment, when the valve is partially open, the impeller will rotate and open the generator as it generates electricity due to the flow and pressure differential across the valve body. The power generated from an automatic control valve constructed in accordance with one or more aspects of the present invention may be propositional to the valve seat opening position and pressure differential across the valve inlet and outlet.

An automatic control valve with an integrated micro-hydro electric generator constructed in accordance with one or more aspects of the present invention presents a sustainable energy solution for, in one example, urban water system supply piping coupled with a min-generator which produces electric power from the water running in city pipelines to, for example, power control and monitoring system devices. The integration of a hydroelectric generating unit with a pressure-reducing valve offers a simple installation with proven technology and components. The hydroelectric power generated by the automatic control valve with an integrated micro-hydro electric generator can be converted AC or DC, charging batteries and/or supply directly to the power grid.

FIG. 1 depicts a conventional pressure-reducing valve 100. As shown in FIG. 1, a conventional pressure-reducing valve 100 has a valve body 102 having a main portion 104 and a top cap portion 106 secured to main portion 104 by, for example, bolts 108. Main portion 104 is typically a casting having an upstream portion 110 with an inlet port 112 surrounded by an inlet mounting flange 114 and a downstream portion 116 with an outlet port 118 surrounded by a similar outlet port mounting flange 120. Main portion 104 also defines an annular valve seat 122. Annular valve seat 122 defines a main valve opening to permit fluid communication between upstream portion 110 and the downstream portion 116. In some embodiments, a seat ring 124 may surround and be secured to annular valve seat 122.

Conventional pressure reducing valve 100 also has a main valve member 130 which is moveable axially between a closed position against annular valve seat 124 to close the valve (as depicted in FIG. 1) and an open position spaced from the seat to control flow of liquid through the valve. Main valve member 130 includes a spool 132, a valve seat plate 134 and a seat seal 136 retained between spool 132 and valve seat plate 134. Spool 132 and valve seat plate 134 are mounted on a valve stem 138 which extends co-axially with a main valve axis 140. A main valve guide 150 has a valve guide 152 mounted to valve seat 124 so as to enclose a lower portion of valve stem 138. Main valve guide 150 assists in maintaining axial motion of valve stem 138 as the main valve member 130 moves along axis 140 between a closed position and an open position.

Top cap portion 106 and main body 104 are separated by a diaphragm 160. Top cap portion 106 and diaphragm 160 define an upper chamber 162. Top cap portion 106 includes an upper valve stem guide 164. Upper valve stem guide 164 has a hollow inner portion having a central axis opening which has a diameter to slidably receive the upper portion of valve stem 138. Valve stem 138 extends through diaphragm 160 and into upper chamber 162 to upper valve stem guide 164. A compression spring 170 encircles upper portion of valve stem 138 and extends from a diaphragm plate 166 located within upper chamber 162 on the opposite side of diaphragm 160 as spool 132. As is well known in the art, the force from spring 170 is used to initiate valve sealing movement by urging main valve member 130 into a closed position against valve seat 122. Pressure reducing valve 100 may also have a pilot control system (not shown) known in the art which cooperates with ports of the valve in upper chamber, upstream portion and downstream portion. During operation, the flow of liquid through the valve opening is modulated by main valve member 130 spaced from the valve seat 122 as determined by pressure in upper chamber 162.

Figure 2:
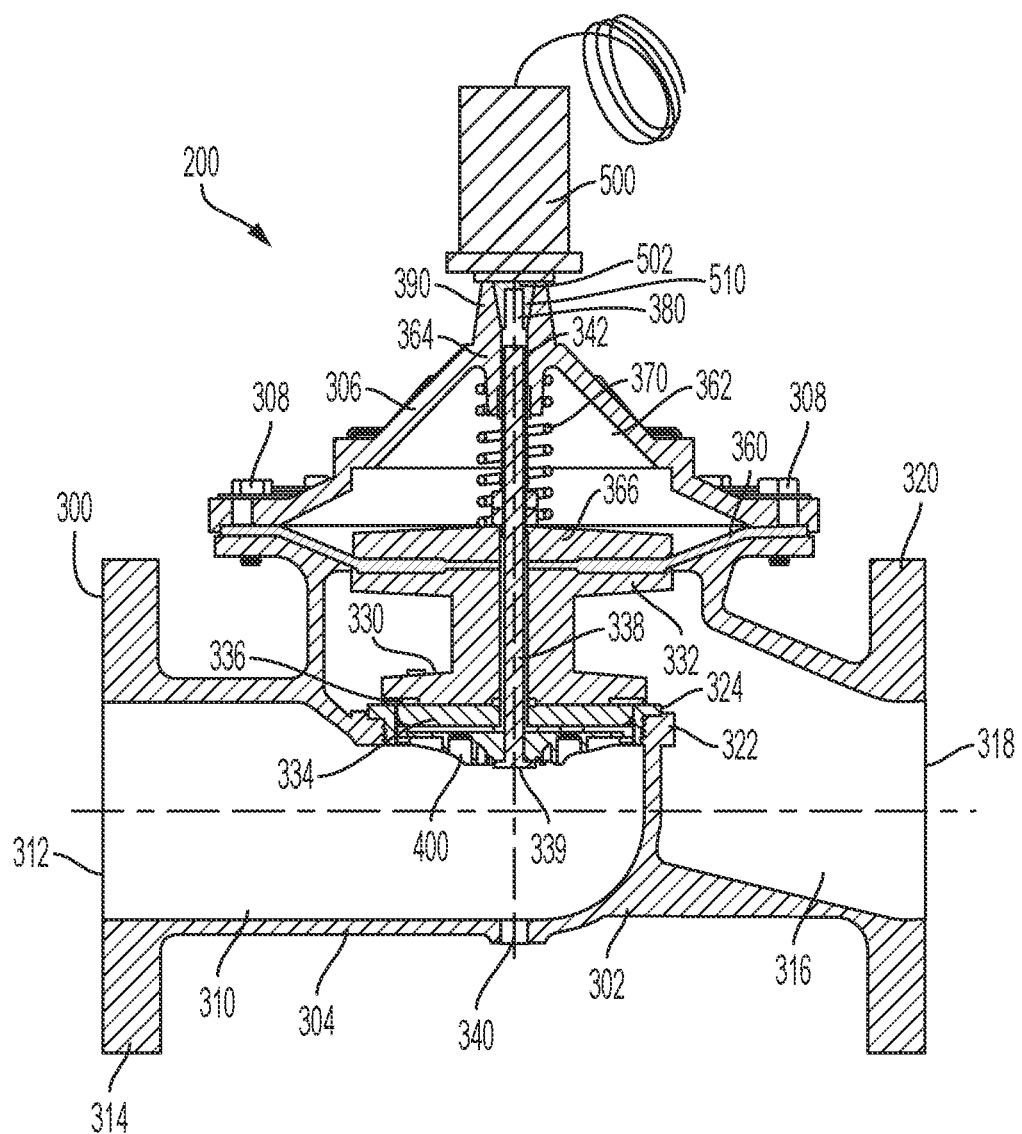
FIG. 2 depicts a cross-sectional view of an automatic control valve in a closed position constructed in accordance with one or more aspects of the present invention.
Figure 3:
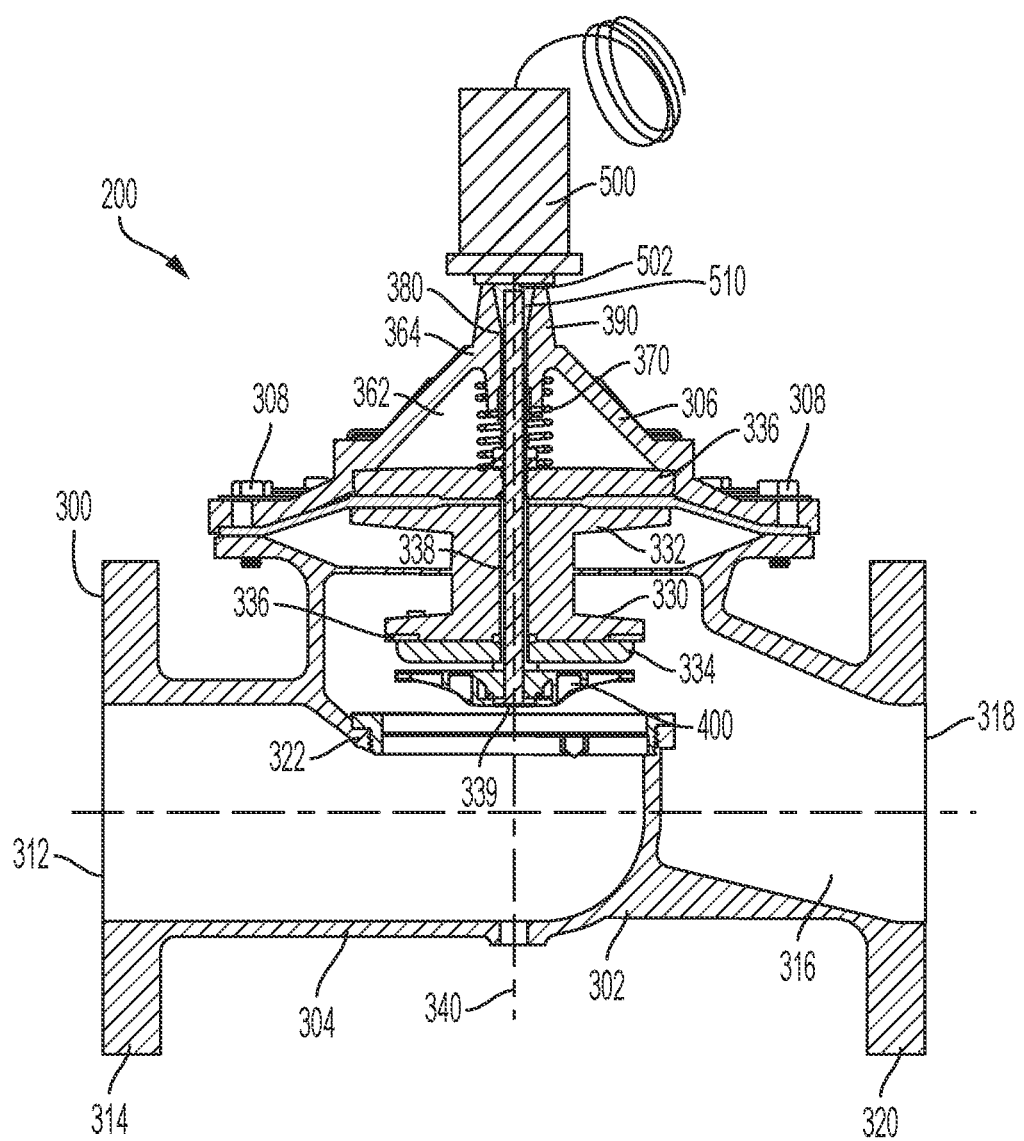
FIG. 3 depicts a cross-sectional view of the automatic control valve of FIG. 2 in an open position constructed in accordance with one or more aspects of the present invention.

FIGS. 2-3 illustrate one embodiment of an automatic control valve with an integrated hydroelectric generating unit constructed in accordance with one or more aspects of the present invention shown in the closed position (FIG. 2) and in the open position (FIG. 3). As illustrated in FIGS. 2-3, one example of an automatic control valve 200 may include the combination of a control valve 300, an impeller 400, and an electric generator 500.

In an example, control valve 300 has a valve body 302 having a main portion 304 and a top cap portion 306 secured to main portion 304 by, for example, bolts 308. Main portion 304 is typically a casting having an upstream portion 310 with an inlet port 312 surrounded by an inlet mounting flange 314 and a downstream portion 316 with an outlet port 318 surrounded by a similar outlet port mounting flange 320. Main portion 304 also defines an annular valve seat 322. Annular valve seat 322 defines a main valve opening to permit fluid communication between upstream portion 310 and the downstream portion 316. In some embodiments, a seat ring 324 may surround and be secured to annular valve seat 322.

Control valve 300 may also include a main valve member 330 which is moveable axially between a closed position against annular valve seat 322 to close the valve (as depicted in FIG. 2) and an open position spaced from valve seat 322 to control flow of liquid through valve 300 (as depicted in FIG. 3). Main valve member 330 includes a spool 332, a valve seat plate 334 and a seat seal 336 retained between spool 332 and valve seat plate 334. Valve stem 338 extends co-axially with a main valve axis 340 through spool 332 and valve seat plate 334. In one embodiment, main valve member 330 incorporates a spring-loaded shaft seal and roller bearing (not shown) to provide support for valve stem 338 and impeller 400. A typical spring-loaded shaft seal is commonly known to provide a dynamic seal separating the "wet and dry" area of a valve water impeller shaft. The shaft hydraulic seal also prevents dirt or other small particles that could harm the shaft bearing and drastically reduce the life span of valves impeller electric generating function according to aspects of the present invention.

Top cap portion 306 and main body 304 are separated by a diaphragm 360. Top cap portion 306 and diaphragm 360 define an upper chamber 362. Top cap portion 306 includes an upper valve stem guide 364. Upper valve stem guide 364 has a hollow inner portion having a central axis opening which has a diameter to slidably receive the upper portion of valve stem 338. Valve stem 338 extends through diaphragm 360 and into upper chamber 362 to upper valve stem guide 364. A compression spring 370 encircles upper portion of valve stem 338 and extends from a diaphragm plate 366 located within upper chamber 362 on the opposite side of diaphragm 360 as spool 332. As is well known in the art, the force from spring 370 is used to initiate valve sealing movement by urging main valve member 330 into a closed position against valve seat 322. Pressure reducing valve 300 may also have a pilot control system (not shown) known in the art which cooperates with ports of the valve in upper chamber, upstream portion and downstream portion. During operation, the flow of liquid through the valve opening is modulated by main valve member 330 spaced from the valve seat 322 as determined by pressure in upper chamber 362.

In an example, valve stem 338 includes a first end 339 and a second end 342. First end 339 of valve stem 338 is connected to impeller 400 below valve seat plate 334 and second end 342 is removably attachable to electric generator 500 within upper valve stem guide 364. In one example of control valve 300 in the closed position as depicted in FIG. 2, impeller 400 does not rotate when valve seat plate 334 is against valve seat 322 because, for example, there is no fluid flowing through valve 300. In another example of control valve 300 in the open position as depicted in FIG. 3, impeller 400 is free to rotate caused by the flow of fluid through control valve 300 from upstream portion 310 to downstream portion 316.

In one example, valve stem 338 is supported and guided by spool 332 as main valve member 330 moves from a closed position to an open position as the automatic control valve modulates flow or pressure differential. The higher the pressure differential is across valve seat 322 the higher impeller 400 rotates and resulting power generation. In the open position, valve stem 338 is rotatable about main valve axis 340 within main valve member 330. In one example, spool 332 may include bearings to assist in the rotation of valve stem 338. As soon as main valve member 330 is unseated from valve seat 322, impeller 400 simultaneously rotates with valve stem 338 as control valve 300 moves into the open position. Main valve member 330, including spool 332, valve seat plate 334 and seat seal 336, does not rotate with impeller 400. Main valve member 330 is independent from impeller 400 except for vertical movement along main valve axis 340 in the vertical movements between the open and closed positions.

In one example, the use of impeller 400 may assist main valve member 330 overcome the initial friction that may exist when control valve 300 is in the closed position. In this example, rotation of impeller 400 may assist the disengagement of main valve member 330 from valve seat 322 and overcome the biasing force caused by spring 370.

In one embodiment, upper valve stem guide 364 includes an opening 380 configured to receive a mating end 510 of electric generator 500. Second end 342 is removably engageable to a mating end 510 of electric generator 500 within opening 380 of top cap portion 390. As main valve assembly 330 moves off valve seat 322 towards the open position, second end 342 of valve stem 338 moves along main valve axis 340 upwardly into opening 380 and engages mating end 510 of electric generator 500. Mating end 510 is connected to the generator drive shaft. Once engaged with mating end 510 of electric generator 500, rotation of impeller 400, which simultaneously rotates valve stem 338 will also cause rotation of the generator drive shaft 502 of electric generator 500 to produce electric power. In one embodiment, mating end 510 may include a male connector while second end 342 of valve stem 338 may include a female connector configured to receive the male connector of mating end 510 and cause the generator drive shaft 502 and valve stem 328 to rotate together as impeller 400 is disengaged from the closed position.

In alternative embodiments, mating end 510 may be telescopically received by second end 342, or vice versa, while main valve assembly 330 moves between the closed and opened positions. In yet another embodiment, an automatic control valve constructed in accordance with one or more aspects of the present invention may utilize, for example, a flexible coupling attached, at one end, to second end 342 of valve stem 338 and, at the other end, to the drive shaft 502 of electric generator 500. A flexible coupling allows for, for example, automatic alignment of valve stem 338 and drive shaft 502 of electric generator 500 and, at the same time, allowing valve stem 338 to move up and down along main valve axis 340 as valve 300 regulates from an open position to a closed position. In yet another embodiment, second end 342 of valve stem 338 may be attached to drive shaft 502 of electric generator 500 by a shaft clutch coupling. In one example, this attachment will only engage electric generator 500 during higher-pressure differentials (normally low flow) and dis-engage during low-pressure (normally high flow) to reduce valves friction loses. In an alternative example, this attachment could also be done by a centrifugal electric switch active by the spinning valve stem 338.

FIGS. 4A-5B illustrated two embodiments of an impeller that may be used with an automatic control valve constructed in accordance with one or more aspects of the present invention. For example, FIGS. 4A-4B illustrate one example of an impeller 420 that includes three passage non-clogging cylindrical vanes that may be utilized as an impeller with an automatic control valve constructed in accordance with one or more aspects of the present invention. FIGS. 5A-5B illustrate another example of an impeller 440 that is a torque flow impeller that that may be utilized as an impeller with an automatic control valve constructed in accordance with one or more aspects of the present invention.

In one embodiment, electric generator 500 may be positioned at or affixed to top cap portion 390 of control valve 300. One example of an electric generator that may be used is the 5 Hp portable outdoor use-only, belt driven generator, item number 165915 available from Northern Tool+Equipment Co. of Burnsville, Minn. As more fluid flows into inlet chamber, impeller 400 will rotate faster and, in turn, result in more generated electric power by electric generator 500. Electric generator 500 generates electricity resulting from the fluid flow and pressure differential across valve inlet 312 and outlet 318 as impeller 400 rotates. The power generated by an automatic control valve 200 constructed in accordance with one or more aspects of the present invention may be, in one example, propositional to valve seat opening position and the pressure differential across the valve apertures. As power is generated by electric generator 500 from the rotation of impeller 400, the power may go back into the grid or drive additional equipment on site. In one example, electric generator 500 can be removed from the main valve body for, for example, service without stopping the water flow through the valve.

During operation of one embodiment of an automatic control valve with an integrated hydroelectric generating unit and impeller constructed in accordance with one or more aspects of the present invention, seat seal 336 of main valve member 330 abuts valve seat 332 in a closed position. As enough fluid flow passes into upstream portion 310 through inlet 312, the fluid forces main valve assembly 330 upward along main valve axis 340. When the fluid force is large enough to overcome the biasing force of spring 370 that keeps valve seat seal 336 against valve seat 324, main valve assembly 330 moves up away from contact with valve seat 324. As valve seat seal 336 is displaced from valve seat 324, valve stem 338 also moves upwardly along main valve axis 340 and engages with mating end 510 of the draft shaft of electric generator 500. The fluid also causes impeller 400 to rotate, which causes both valve stem 338 and the draft shaft of electric generator 500 to simultaneously rotate to start generating electric power.

An automatic control valve with an integrated hydroelectric generating unit and impeller constructed in accordance with one or more aspects of the present invention is capable of being installed in numerous configurations or orientations, including, for example, vertically, horizontally or upside down, depending on its size. Due to the compact configuration of automatic control valve with an integrated hydroelectric generating unit and impeller constructed in accordance with one or more aspects of the present invention, no additional piping or physical space is needed beyond the automatic control valve.

In operation, an automatic control valve with an integrated hydroelectric generating unit and impeller constructed in accordance with one or more aspects of the present invention converts kinetic (motion) energy into electricity. A typical generator includes a stationary magnetic field (stator) in which a rotating electromagnet (armature) spins to produce electrical current, which is the purpose of generator 500. With an automatic control valve with an integrated hydroelectric generating unit and impeller constructed in accordance with one or more aspects of the present invention, main valve assembly 330 is equipped with a rotating impeller 400 which turns a rotating drive shaft 502 that turns the armature of electric generator 500. The fluid flowing through valve 300 causes a force to spin impeller 400.

Figure 6:
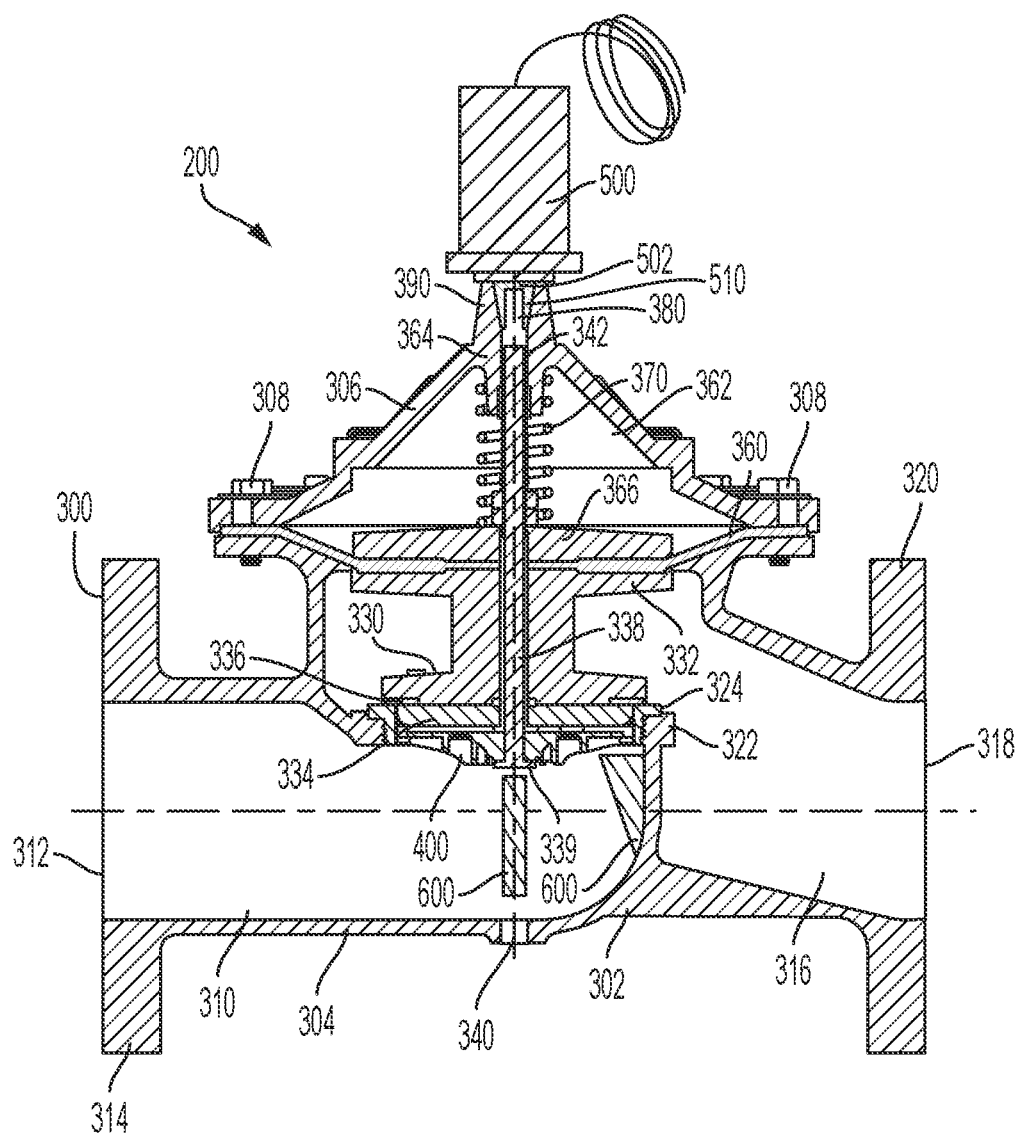
FIG. 6 depicts an automatic control valve constructed in accordance with one or more aspects of the present invention including one or more inlet flow diffusers examples.

In one example illustrated in FIG. 6, an automatic control valve constructed in accordance with one or more aspects of the present invention may include one or more inlet flow diffusers 600 positioned on an inside wall in upstream portion 310 of control valve 300. In one example, inlet flow diffusers are positioned below annular valve seat 322. Inlet flow diffusers 600 act as flow straightening vane to provide more laminar flow conditions for proper rotation of impeller 400 and valve operation. The inlet flow diffusers 600 can be located vertically in an axial direction to the flow path or in an angle thereto stimulate proper and optimum rotation of impeller 400. In one embodiment, inlet flow diffusers 600 may include a streamline cross-sectional area that does not promote clogging caused by foreign material in the flow stream.

In one example, the amount of water horsepower (Hp) that could be generated by an automatic control valve with an integrated hydroelectric generating unit and impeller constructed in accordance with one or more aspects of the present invention may be determined by multiplying the total dynamic head (TDH in Feet) times the flow (GPM), divide by 3,960 and multiple by an efficiency factor. The total dynamic head (TDH in feet) could be determined by multiplying 2.31 (a conversion factor of 1 PSI=2.31 feet of water column) times the difference between the inlet pressure (PSI=Pressure per square inch) and outlet pressure (in PSI) associated with impeller 400. In one example using, for example, a 5 Hp portable outdoor use-only, belt driven generator, item number 165915 available from Northern Tool+Equipment Co. of Burnsville, Minn. (see e.g. https://www.northerntool.com/shop/tools/product_21008_21008 or Owner's Manual: https://www.northerntool.com/images/downloads/manuals/165915.pdf) , where the inlet pressure is 100 psi and the outlet pressure is 50 psi, the flow is 200 GPM and, assuming, an efficiency of approximately 85%, the water horsepower (Hp) would be 4.95 Hp or, if converted into 2,600 Watt according to the generator manufacturer.

Example #1:

Valve Inlet Pressure($P1$) = 100$PSI$  Valve Outlet Pressure($P2$) = 50$PSI$

Total Dynamic Head($TDH$ in Feet) =

$$(P1 - P2) * 2.31 = (100 - 50) * 2.31 = 115.5 \text{ Feet}$$

$$\text{Flow}(GPM) = 200 GPM$$

$$\text{Efficiency}(\%) = 85\% \text{ (assumed)}$$

$$\text{Water Horse Power}(Hp) = \frac{115.5(TDH \text{ in Feet}) \times 200(GPM)}{3,960} \times 85(\%) =$$

$$4.95 \text{ Hp}$$

Or 3.69 kW(745.7 Watts = 1 HP)

The Affinity Laws regarding pump and turbine impeller rotation speed (RPM) may apply to this new art. This hydraulic law states that flow (GPM) is directly proportional to impeller rotation speed (RPM) and that the speed is related in the square to the dynamic head (Feet). In addition, the speed is related in the cube to the power (kW or BHp).

| The Affinity Laws Regarding Speed | |
|---|---|
| flow | $\frac{gpm_{old}}{gpm_{new}} \approx \frac{rpm_{old}}{rpm_{new}}$ |
| head/pressure | $\frac{head_{old}}{head_{new}} \approx \left[\frac{rpm_{old}}{rpm_{new}}\right]^2$ |
| power | $\frac{kW_{old}}{kW_{new}} \text{ or} \frac{BHp_{old}}{BHp_{new}} \approx \left[\frac{rpm_{old}}{rpm_{new}}\right]^3$ |

While embodiments of the invention have been illustrated and described in detail in the disclosure, the disclosure is to be considered as illustrative and not restrictive in character.

All changes and modifications that come within the spirit of the invention are to be considered within the scope of the disclosure.

The invention claimed is:

1. A valve, said valve comprising:
   a housing, said housing including an inner periphery surface defining a passage therethrough between an inlet port and an outlet port;
   a flange, said flange within said housing, said flange dividing the passage into an inlet chamber proximate the inlet port and an outlet chamber proximate the outlet port, said flange extending circumferentially around the inner periphery surface of said housing, said flange defining a valve seat and including an inner surface defining a valve aperture;
   a valve member, said valve member moveably disposed within said housing from an open position and a closed position, said valve member controlling fluid flow between the inlet chamber and the outlet chamber through the valve aperture, said valve member resiliently biased in a closed position against the valve seat;
   a rotatable shaft, said rotatable shaft including a first end and a second end, said rotatable shaft extending through said valve member and rotatable relative to the valve member;
   an impeller, said impeller affixed to said rotatable shaft at the first end, said impeller rotatable when valve member is in the open position; and
   a generator, the second end of said rotatable shaft operably affixed to said generator in the open position.

2. The valve of claim 1, wherein at least a portion of said impeller is located in the valve aperture in the closed position.

3. The valve of claim 1, wherein at least a portion of said impeller is located in the inlet chamber in the closed position.

4. The valve of claim 1, wherein at least a portion of said impeller is located in the outlet chamber in the open position.

5. The valve of claim 1, wherein the second end of said rotatable shaft is operably connected to a drive shaft of said generator.

6. The valve of claim 5, where the second end of said rotatable shaft is operably connected to the drive shaft of said generator by a flexible coupling.

7. The valve of claim 1, wherein said housing includes a main body and a top portion, the main body and the top portion being separated by a diaphragm.

8. The valve of claim 1, wherein said generator is attachable to the top portion of said housing.

9. The valve of claim 1, wherein said valve member includes one or more roller bearings to support said rotatable shaft.

10. The valve of claim 9, wherein said valve member includes one or more spring-loaded shaft seals with said one or more roller bearings.

11. The valve of claim 1, wherein a spring biases the valve head of said valve member in a closed position.

12. The valve of claim 1, wherein said impeller includes three or more passage non-clogging cylindrical vanes.

13. The valve of claim 1, wherein said impeller is a torque flow impeller.

14. A valve, said valve comprising:
   a housing, said housing including an inner periphery surface defining a passage therethrough between an inlet port and an outlet port;
   a flange within said housing, said flange dividing the passage into an inlet chamber proximate the inlet port and an outlet chamber proximate the outlet port, said flange extending circumferentially around the inner periphery surface of said housing, said flange defining a valve seat and including an inner surface defining a valve aperture;

a valve member, said valve member moveably disposed in the outlet chamber of said housing for controlling fluid flow between the inlet chamber and the outlet chamber through the valve aperture, said valve member resiliently biased in a closed position against the valve seat, said valve member including a valve head, the valve head including an outer surface, the outer surface of said valve member engaging the valve seat in the closed position;

a rotatable shaft, said rotatable shaft including a first end and a second end, the first end of said shaft extending through and rotatable relative to the valve head of said valve member and into the valve aperture;

an impeller, said impeller affixed to said rotatable shaft at the first end, wherein said impeller simultaneously rotates with said rotatable shaft; and a generator, the second end of said rotatable shaft operably and removably affixed to said generator in the open position.

15. The valve of claim 14, wherein the second end of said rotatable shaft is operably connected to a drive shaft of said generator.

16. The valve of claim 15, where the second end of said rotatable shaft is operably connected to the drive shaft of said generator by a flexible coupling.

17. The valve of claim 16, wherein said valve member includes one or more roller bearings to support said rotatable shaft.

18. The valve of claim 17, wherein said valve member includes one or more spring-loaded shaft seals with said one or more roller bearings.

19. The valve of claim 14, wherein said impeller is supported and guided by said valve member.

20. The valve of claim 15, where the second end of said rotatable shaft is operably connected to the drive shaft of said generator by a shaft clutch coupling.

21. The valve of claim 14, wherein said valve is installed in a horizontal, vertical or upside orientation.

22. The valve of claim 14, wherein said valve includes one or more inlet flow diffusers, the one or more inlet flow diffusers positioned within the inlet chamber below the valve seat.

23. The valve of claim 22, wherein the one or more inlet flow diffusers include a cross-section area that prevents clogging of foreign material during fluid flow through said valve.

24. The valve of claim 14, wherein said generator is removable from said housing for service without stopping control of fluid flow through said valve.

* * * * *